(12) United States Patent
Shikata et al.

(10) Patent No.: US 6,474,716 B2
(45) Date of Patent: Nov. 5, 2002

(54) WIRING SYSTEM OF INDICATION INSTRUMENT FOR VEHICLE

(76) Inventors: Kazushi Shikata, c/o Denso Corporation, 1-1, Showa-Cho, Kariya-City, Aichi-Pref., 448-8661 (JP); Shigeo Numazawa, c/o Denso Corporation, 1-1, Showa-Cho, Kariya-City, Aichi-Pref., 448-8661 (JP); Tomohiro Kamiya, c/o Denso Corporation, 1-1, Showa-Cho, Kariya-City, Aichi-Pref., 448-8661 (JP); Satoshi Mizutani, c/o Denso Corporation, 1-1, Showa-Cho, Kariyo-City, Aichi-Pref., 448-8661 (JP); Hikaru Sugi, c/o Denso Corporation, 1-1, Showa-Cho, Kariya-City, Aichi-Pref., 448-8661 (JP)

( * ) Notice: Subject to any disclaimer, the term of this patent is extended or adjusted under 35 U.S.C. 154(b) by 0 days.

(21) Appl. No.: 09/732,801

(22) Filed: Dec. 8, 2000

(65) Prior Publication Data

US 2001/0003404 A1 Jun. 14, 2001

(30) Foreign Application Priority Data

Dec. 10, 1999 (JP) ............................................. 11-352001

(51) Int. Cl.[7] ............................................... B62D 25/14
(52) U.S. Cl. .............................. 296/70; 180/90; 439/34
(58) Field of Search ............................. 296/70, 72, 74, 296/194, 208; 180/90; 439/34

(56) References Cited

U.S. PATENT DOCUMENTS

| | | | | |
|---|---|---|---|---|
| 5,297,334 A | * | 3/1994 | Johnson | 296/70 X |
| 5,324,203 A | * | 6/1994 | Sano et al. | 296/70 X |
| 5,549,344 A | * | 8/1996 | Nishijima et al. | 296/70 |
| 5,707,100 A | * | 1/1998 | Suyama et al. | 296/70 X |
| 6,048,020 A | * | 4/2000 | Gronowicz et al. | 296/70 |
| 6,250,706 B1 | * | 6/2001 | Davis, Jr. et al. | 296/70 |
| 6,364,394 B1 | * | 4/2002 | Davis, Jr. et al. | 296/70 |

* cited by examiner

Primary Examiner—Joseph D. Pape
(74) Attorney, Agent, or Firm—Harness, Dickey & Pierce, PLC

(57) ABSTRACT

A wiring system of indication instrument for vehicle includes a transverse member disposed inside the indicating instrument to extend in a transverse direction of the vehicle, a wire-integrated cluster disposed inside the indication instrument and an electric distributor box disposed at an end of the transverse member. The cluster includes a bundle of main lead wires disposed to extend straight along said transverse member, and the distributor box distributes electric power and signals transmitted by the wire-integrated cluster.

6 Claims, 8 Drawing Sheets

WIRING SYSTEM OF INDICATION INSTRUMENT FOR VEHICLE

CROSS REFERENCE TO RELATED APPLICATION

The present application is based on and claims priority from Japanese Patent Application Hei 11-352001 filed Dec. 10, 1999, the contents of which are incorporated herein by reference.

BACKGROUND OF THE INVENTION

1. Field of the Invention

The present invention relates to a wiring system disposed in a vehicle indication instrument and, particularly, a vehicle cockpit module in which a device such as parts of an air conditioner is integrated into the module, which is mounted in the indication instrument.

2. Description of the Related Art

In a vehicle, such as a passenger car, an electric wiring system, which is disposed in an indication instrument, is mainly comprised of a cowl wiring section held at the cowling portion of a vehicle body and an instrument wiring section held at the indication instrument. Generally, the cowling portion is disposed at an upper portion of a partition (or firewall) between an engine compartment and a passenger compartment to accommodate a wiper motor or others.

The cowl wiring section is provided for electrical connection of body-side devices, such as an air conditioner and the like, that are fixed to the side of the partition facing the passenger compartment. On the other hand, the instrument wiring section is provided for instrument-side devices, such as various meters, a radio set, or an audio set.

An electric wiring system disposed in a conventional indication instrument necessitates connection works for the cowl wiring and the instrument wiring separately. In addition, the cowl wiring and the instrument wiring have to be carried out inside the indication instrument that has complicated wiring patterns.

Accordingly, the connection work inside the indication instrument is very difficult and needs much time. In addition, the connection work needs many wiring protectors and wiring clamps, resulting in a heavy and expensive wiring system.

SUMMARY OF THE INVENTION

In view of the above circumstances, a main object of the present invention is to provide a simple electric wiring system inside the vehicle indication instrument.

Another object of the present invention is to provide a wiring system that is suitable to a vehicle cockpit module, which integrates various devices therein and is disposed inside the indication instrument.

In order to fulfill the above objects, a main feature of the invention is the following wiring system of indication instrument for a vehicle that includes a transverse member extending in the right to left direction of a vehicle inside the indicating instrument, a wire-integrated cluster formed of a bundle of main lead wires disposed inside the indication instrument, and a pair of electric distributor boxes disposed at opposite ends of the transverse member.

The wire-integrated cluster extends generally straight along the transverse member. The main lead wires jointly transmit electric signals or supply electric power among a plurality of devices inside and outside the indication instrument. The pair of electric distributor boxes connects electric circuits on the engine compartment side and electric circuits on the passenger compartment side.

The transverse member, the wire-integrated cluster and the pair of electric distributor boxes are integrated or assembled into the cockpit module that is disposed inside the indication instrument, and all the connection works around the indication instrument can be completed.

As a result, the connection works around the indication instrument can be carried out very easily after the cockpit module is mounted in the vehicle.

According to another feature of the invention, a reinforcement member is disposed inside the indication instrument to extend right to left along the transverse member, and the transverse member is provided with portions to be fixed to the reinforcement member.

Therefore, the transverse member and the wire-integrated cluster can be assembled into the cockpit module after the transverse member is supported by the reinforcement member.

According to another feature of the invention, the pair of electric distribution boxes is fixed to the transverse member.

Therefore, the pair of electric distributor boxes can be assembled into the cockpit module after it is fixed to the transverse member.

According to another feature of the invention, each of the pair of electric distribution boxes has a side bracket for fixing one end of the reinforcement member to a side portion of the vehicle and is fixed to each of the left and right ends of the reinforcement member.

This reduces the number of parts and the cost.

According to another feature of the invention, the indication instrument is disposed adjacent a partition for separating an engine compartment from a passenger compartment, and the pair of electric distribution boxes is provided with penetrating connectors penetrating the partition.

Therefore, the penetrating connectors make the connection works of the pair of electric distributor boxes and the electric circuits on the engine compartment side of the partition easy.

According to another feature of the invention, receptacle connectors branch from the wire-integrated cluster and fixed to the transverse member, and connectors of various devices disposed in the indication instrument are fitted to the receptacle connectors.

According to another feature of the invention, a plurality of the receptacle connectors is fixed to the transverse member, and at least one of the receptacles has an aligning structure for adjusting the position for receiving the connector.

Therefore, even if there is a slight distance between the receptacle connectors and the connectors to be coupled of the devices on the side of the indication instrument, the aligning structure can absorb the distance to complete the connection.

According to a further another feature of the invention, the transverse member comprises a duct of an air conditioner for conducting air. Therefore, the duct is effectively used to assemble the wire-integrated cluster into the indication instrument.

According to another feature of the invention, the air conditioner has a pair of side-surface air-outlets, disposed opposite ends of the indication instrument, for blowing air toward the upper half body of a passenger, and the duct conducts air to the side-surface air-outlets.

Therefore, the side-surface air-outlets can be utilized to assemble the wire-integrated cluster into the indication instrument.

According to another feature of the invention, the duct is provided with a straight gutter-shaped wire-holder. Therefore, the wire-integrated cluster is disposed on the gutter-shaped wire-holder.

According to a further feature of the invention, an airblow unit is integrated into an air conditioner unit. The air conditioner unit has a heat exchanger for the air supplied from the air-blow unit.

Therefore, the air-blow unit, air conditioner and the wiring system inside the indication instrument can be integrated into the cockpit module via the duct.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DESCRIPTION OF PREFERRED EMBODIMENTS OF THE INVENTION

Figure 1:
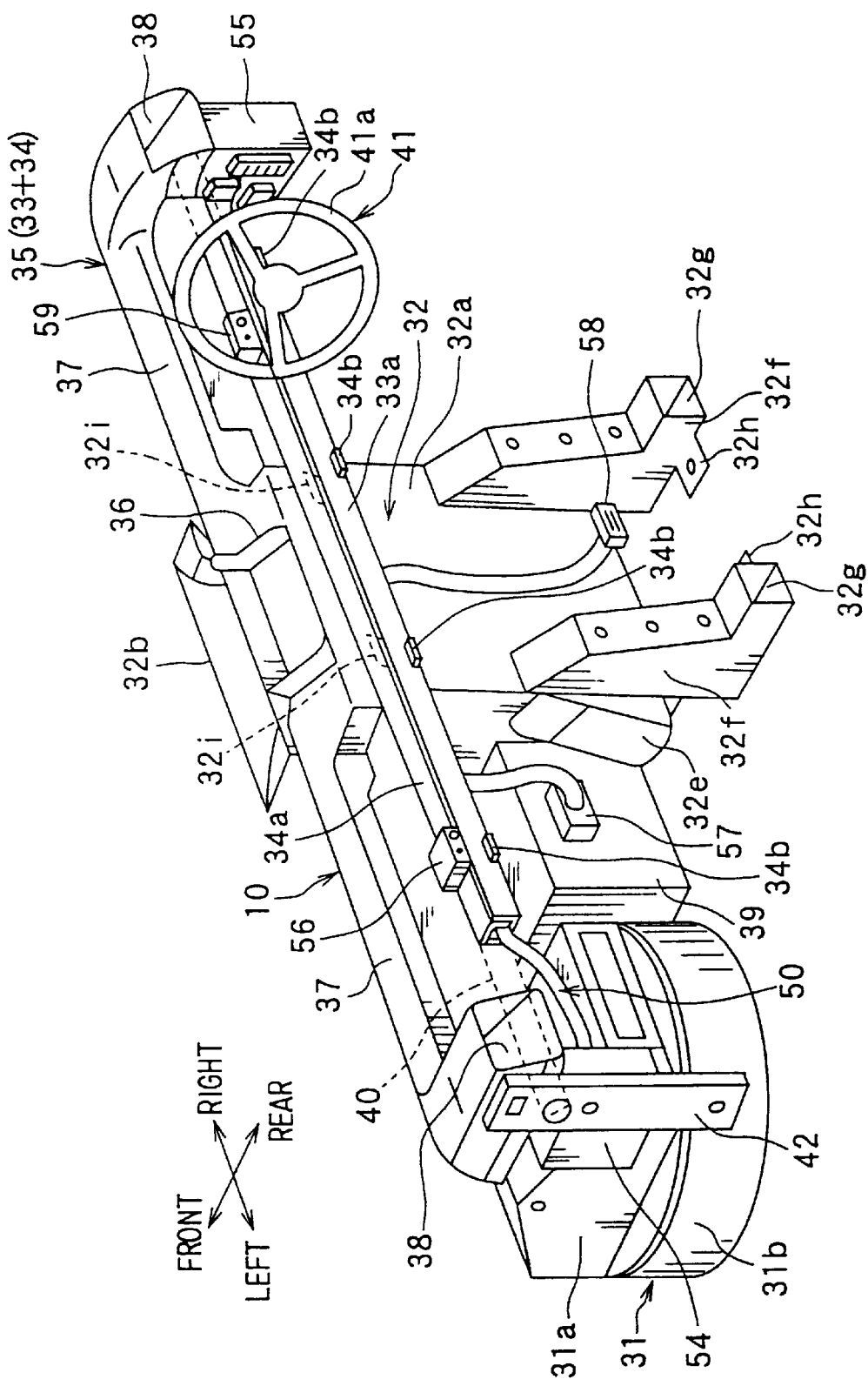
FIG. 1 is a perspective view of a cockpit module according to a first embodiment of the invention.

In the meantime, the reference numerals in the parentheses correspond to the portions disclosed in the following embodiments.

Figure 2:
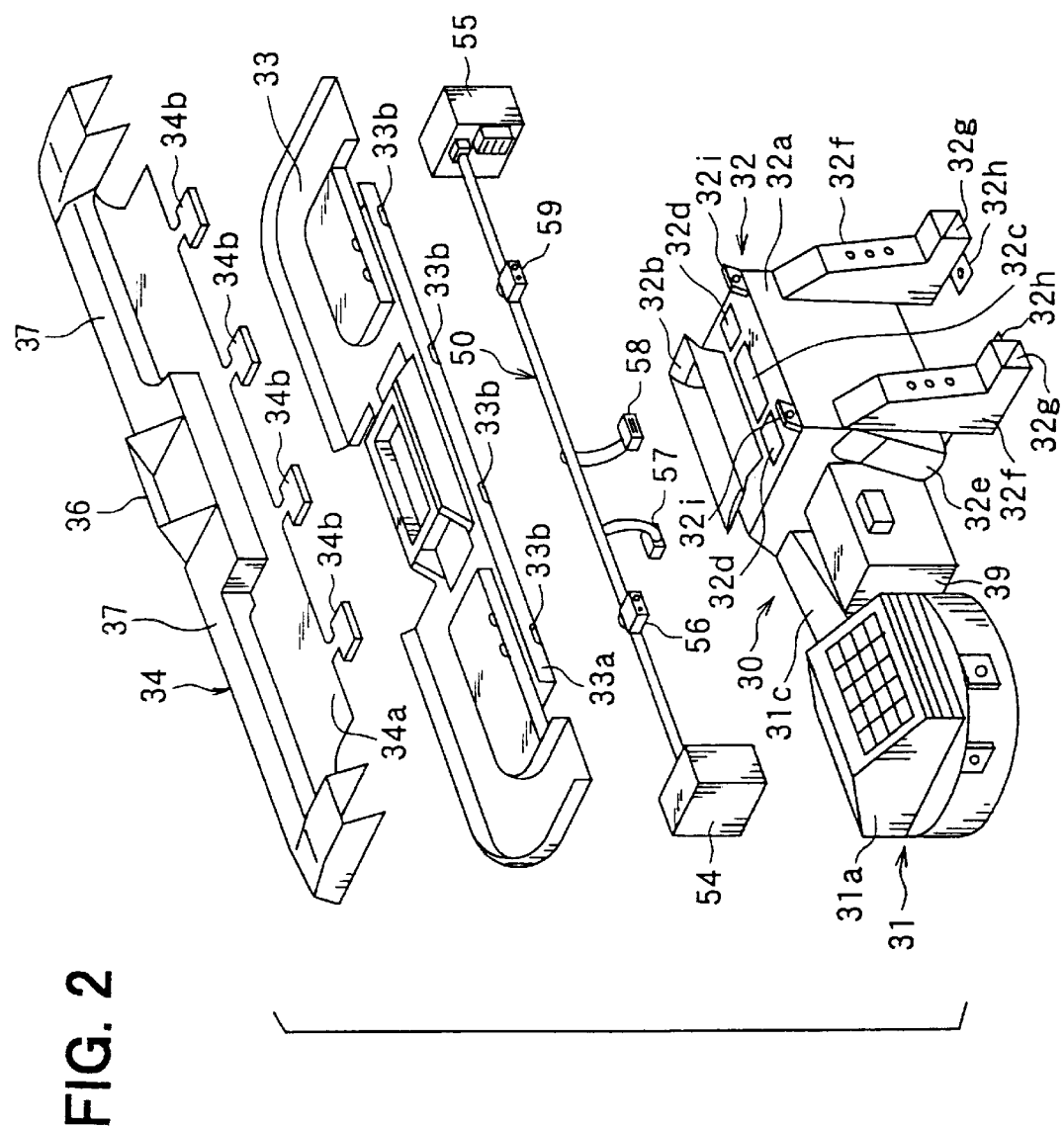
FIG. 2 is an exploded perspective view of a main portion illustrated in FIG. 1.
Figure 3A:
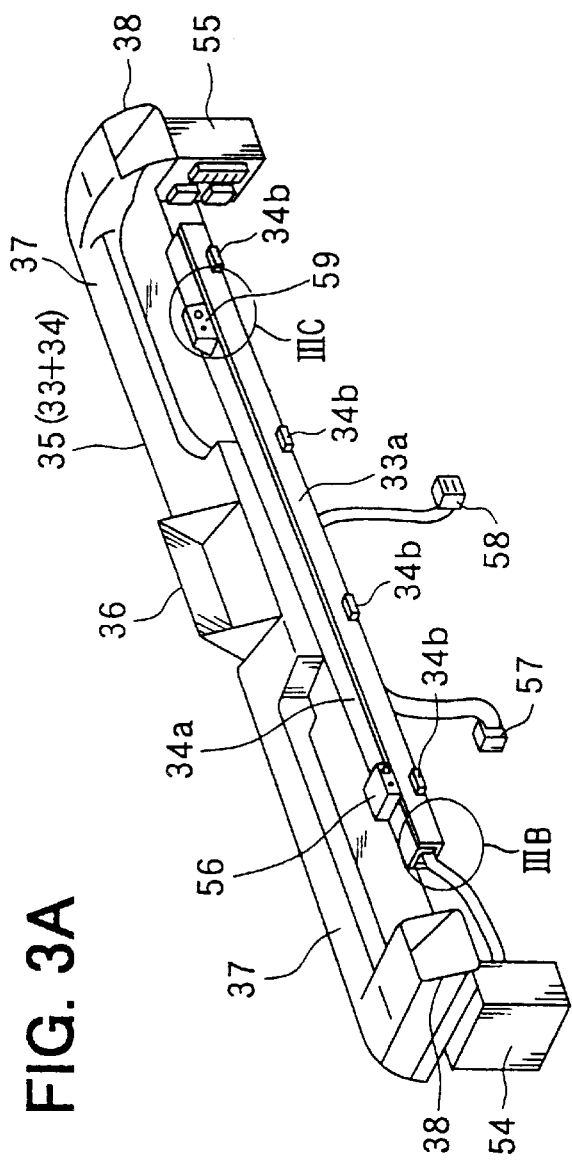
FIG. 3A is a perspective view of an air conditioning duct.
Figure 3C:
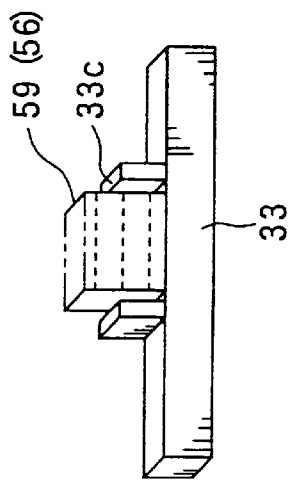
FIGS. 3B and 3C are fragmentary enlarged views of main portions thereof.
Figure 3B:
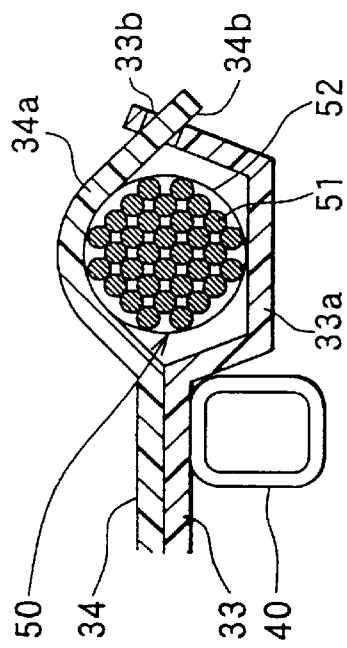
Figure 4:
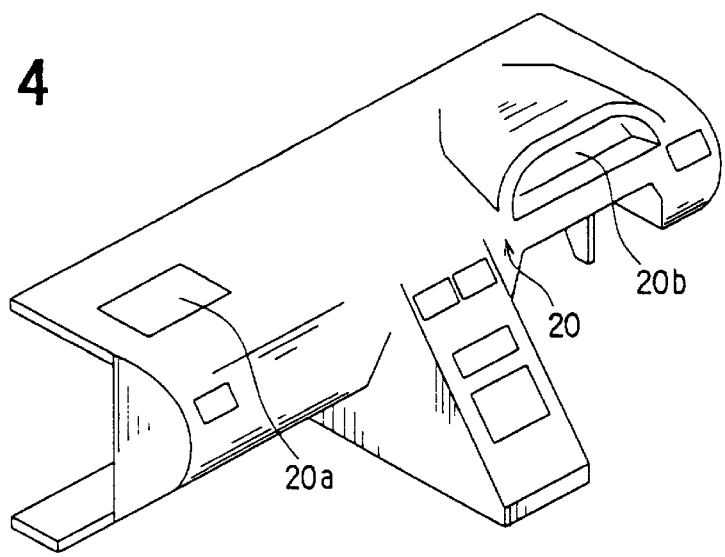
FIG. 4 is a schematic perspective view of a portion of an indication instrument according to the invention.

An indication instrument according to a first embodiment of the invention is described with reference to FIGS. 1–4. Cockpit module 10 is disposed in vehicle indication instrument 20, which is illustrated in FIG. 4. Indication instrument 20 accommodates vehicle air conditioner 30, as shown in FIG. 2. In FIG. 1, crossing arrows indicate front-rear and right-left directions of the indication instrument mounted in a vehicle.

The word "cockpit module" used here includes not only an arrangement of indication instrument 20 that accommodates integrated devices but also various arrangements of indication instrument 20 that accommodates separately mounted devices.

Vehicle air conditioner 30 includes air blow unit 31 and air conditioning unit 32. Air conditioner 30 for a right-steering-wheel vehicle is shown here. Therefore, air blow unit 31 is disposed at the left passenger seat, and air conditioning unit 32 is disposed approximately at the center of the side-to-side direction of the vehicle.

Since air blow unit 31 and air conditioning unit 32 are well known, only a brief description is given here. Air blow unit 31 has inside-outside air-switching box 31a disposed at the upper portion thereof and a centrifugal fan 31b that blows air from air-switching box 31a. Centrifugal fan 31b is comprised of a centrifugal fan-blade member and a scroll case. Reference numeral 31c indicates an air-blow duct of centrifugal fan 31b.

Air conditioning unit 32 controls the temperature of air supplied from air blow unit 31 and supplies the temperature controlled air to the inside of the passenger compartment. Air conditioning unit 32 has resinous case 32a connected to air blow duct 31c. An evaporator as an air-cooling heat-exchanger, a hot-water-type heater core as an air-heating heat-exchanger, a temperature controlling air-mixing damper, and an air-blow-mode door of an air-blow-mode switching mechanism are accommodated in resinous case 32a.

Defroster opening 32b is formed at the upper front surface of case 32a of air conditioning unit 32, and center-face opening 32c (shown in FIG. 2) and side-face opening 32d are respectively formed at the upper rear surface thereof. Front-seat foot-warming-ducts 32e are respectively integrated into right and left sides of case 32a. Rear-seat foot-warming ducts 32f are respectively integrated to right and left sides of the rear surface of case 32a.

A rear-seat-foot-warming joint-duct (not shown) is connected to end-opening 32g of rear-seat foot-warming duct 32f so that warm air can blow from rear-seat foot-warming duct 32f on the feet of passengers sitting on the rear seat. Each rear-seat foot-warming duct 32f projects backward from case 32a so that a concave space for a center cluster, which will be discussed below, can be formed between two rear-seat foot-warming ducts 32f.

Fixture plate 32h projects inward from the bottom of each rear-seat foot-warming duct 32f. Fixture plates 32h fix the bottom of air conditioning unit 32 to a vehicle floor.

Reinforcement bar 40 is disposed inside indication instrument 20 to extend in the right-to-left direction over the length of indication instrument 20. Reinforcement bar 40 is a bar, such as a hollow bar or a pipe. The bar may have a round cross-section (shown in FIG. 5) as well as the rectangular cross-section shown in FIG. 3.

Reinforcement bar 40 is made of iron-based metal and is a member for mainly supporting vehicle steering unit 41. In a vehicle equipped with a right steering wheel, a supporting member (not shown) of the steering unit 41 is fixed or welded to a right portion of reinforcement bar 40. The supporting member is made of iron-based metal to support a housing (not shown) of a shaft of steering unit 41.

Separate flat metal-made side-brackets 42, shown in FIG. 1, are respectively fixed or welded to right and left ends of reinforcement bar 40. (FIG. 1 does not illustrate the right side-bracket 42.) Side-brackets 42 respectively fix opposite ends of reinforcement bar 40 to opposite side portions of a vehicle by fastening members such as screw bolts.

Duct-base-plate 33 forms a lower portion of a face-blow-passage of air conditioning unit 30. Duct-base-plate 33 is a flat resinous mold that is approximately as long as indication instrument 20. The thickness and material of duct-base-plate 33 are selected to have a suitable strength to maintain the original flat shape thereof. Duct cover 34 is a mold of resinous material and forms into a suitable shape for the upper portion of the face-blow-passage. Duct cover 34 is air-tightly fixed to duct-base-plate 33 by a fixing means such as glue or welding.

The resinous material of duct cover 34 is elastic material such as polypropylene or polyethylene so that noises around the duct can be effectively absorbed and so that elastic wire-fixing member 34a can be integrated to the end of duct cover 34 at a vehicle's rear portion. Four T-shaped hook members 34b are formed along right-to-left direction of duct cover 34 to project from wire-fixing member 34a.

Duct 35 has duct cover 34 that is air-tightly fixed to duct-base-plate 33. Duct 35 is disposed inside indication instrument 20 to extend in the transverse or side-to-side direction of the vehicle above air blow unit 31 and air conditioning unit 32.

Center-face duct-joint 36, which connects to center-face opening 32c of case 32a, is disposed at the center of the transverse length of duct 35. Side-face duct 37 connects to side-face openings 32d formed at right and left sides of center-face duct-joint 36.

Side-surface ducts 37 respectively extend right and left from duct-joint 36. As shown in FIG. 3, side-surface ducts 37 respectively have side-surface blow-outlets 38. Side-surface blow-outlets 38 are respectively located at right and left ends of indication instrument 20 to blow cooling air on the upper half of a passenger's body or hot air on the windshield. A center face duct (not shown) is connected to center-face duct-joint 36 to blow cooling air on the upper half body of a passenger from the center-face air-blow-outlet. A defroster air-blow outlet (not shown) is connected to defroster opening 32b (shown in FIG. 2) to blow air on the vehicle windshield.

A fixing portion (not shown) fixed to duct-base-plate 33 by a fastening member such as a screw bolt is disposed on the upper surface of air blow unit 31. Although not shown in FIG. 1, a partition (firewall) for separating the engine compartment from the passenger compartment is disposed in front of cockpit module 10 with regard to the vehicle. Therefore, a fixing member of air blow unit 31 (not shown) is disposed in front of air-blow unit 31 to be fixed to the partition. Because air blow unit 31 is disposed near the passenger seat on the left side of the vehicle, air blow unit 31 may have a fixing member to be fixed to left side-bracket 42.

Fixing plate portions 32i are integrated to the most rear right and most rear left portions of the upper surface of case 32a of air conditioning unit 32. Fixing plate portions 32i are respectively fixed to duct-base-plate 33 (shown in FIG. 2) by screw bolts or the like.

Reference numeral 39 indicates an electronic control device having various control units including an air conditioning control unit. Electronic control unit 39 is disposed at a portion behind air-blow duct 31c between air blow unit 31 and air conditioning unit 32.

The electric wiring system disposed inside indication instrument 20 is described below. Wire-integrated cluster 50, as shown in FIG. 3, has a plurality of main wires that are integrated in a bundle and disposed inside indication instrument 20. The bundle is covered with insulation resinous member 52. Main wires 51 include wires for transmitting electric signals or supplying electric power among a plurality of devices that are disposed inside and outside the indication instrument 20. Wire-integrated cluster 50 corresponds to a conventional device having integrated unit of the cowl wires and instrument wires.

Wire holder 33a straightly extends in the transverse or right-to-left direction of the vehicle and is integrated to the rear end of duct-base-plate 33, which forms the lower portion of duct 35. Wire holder 33a is formed into a gutter-shape in cross-section so that wire-integrated cluster 50 can be held in wire-holder 33a. Duct 35 having wire-holder 33a is a transverse member extending in the transverse direction of the vehicle.

Wire holder 33a has four holes 33b in which T-shaped hook members 34b of wire-fixing member 34a are inserted. Therefore, the upper surface of wire-integrated cluster 50 is covered with wire-fixing member 34a and is pressed down after wire-integrated cluster 50 is put in wire holder 33a.Then four T-shaped hook members 34b are respectively inserted into holes 33b and fixed to wire holder 33a.

Thus, wire-integrated cluster 50 is fixedly mounted on wire holder 33a of duct-base-plate 33 by making use of wire-fixing member 34a and T-shaped hook members 34b.

Because duct-base-plate 33 is disposed adjacent reinforcement bar 40 as shown in FIG. 3, it is possible to fix duct-base-plate 33 to reinforcement bar 40 by screw bolts (not shown) or the like.

Electric distributor boxes (or junction boxes) 54 and 55 are respectively connected to right and left ends of wire-integrated cluster 50. Distributor boxes 54 and 55 distribute electric signals and power between electric circuits in the engine compartment and electric circuits in the passenger compartment, between electric circuits of indication instrument 20 and electric circuits on the body side of the passenger compartment, and between electric circuits in indication instrument 20 and electric circuit on the rear-seat side of the passenger compartment.

Therefore, distribution wires are disposed inside resinous distributor boxes 54 and 55, and connectors are disposed at the outside of distributor boxes 54 and 55.

Upper surfaces of distributor boxes 54 and 55 are fixed to the right and left ends of duct-base-plate 33 by screw bolts or the like. It is possible to mount an electronic control device that includes a microcomputer, a relay or fuse-box in distributor boxes 54 and 55.

Four connectors 56–59 are connected to portions between the right and left ends of wire-integrated cluster 50. Connectors 57 and 58 are disposed at inner portions and respectively connected to the ends of comparatively longer wires that branch from wire-integrated cluster 50. Connector 57 is connected to electronic control device 39, as shown in FIG. 1.

Connector 58 is connected to a center cluster that is fixed to a portion between right and left rear-seat foot-warming ducts 32f. The center cluster is provided for an integrated assembly of a radio set, an audio set and other devices.

Wire fixing member 34a of duct cover 34 has cutout portions. Connector holders 33c (shown in FIG. 3) are integrated to portions of duct-base-plate 33 that correspond to the cutout portions so that left connector 56 and right connector 59 are respectively fitted to connector holders 33c and fixed at predetermined positions.

Left connector 56 is connected to, for example, air bag unit 20a for the front passenger seat shown in FIG. 4, and right connector 59 is connected to, for example, meter module 20b shown in FIG. 4, which includes a plurality of meters such as a speedometer. Connectors (not shown) are fixed to portions behind air bag unit 20a for a passenger seat and meter module 20b. Connectors 56 and 59, which are fixed to duct-base-plate 33, are male connectors to be coupled to female connectors on the other side.

When meter module 20b is fixed to a predetermined position of indication instrument 20, the connector of meter module 20b can be fitted to connector 59 on the side of duct-base-plate 33.

Therefore, when meter module 20b is mounted in indication instrument 20, the connection of meter module 20b and wire-integrated cluster 50 can be carried out concurrently. When air bag unit 20a for the front passenger seat is mounted in a predetermined portion of indication instrument 20, the connector of air bag unit 20a can be fitted to connector 56 that is fixed to duct-base plate 33. Therefore, wiring connection can be carried out concurrently when air bag unit 20a for a passenger seat is mounted.

In other words, connectors 56 and 59 are receptacle connectors that are fixed to portions to connect air bag unit 20a for a passenger seat and meter module 20b.

Inner connector 58 is also a receptacle connector connected to a center cluster (not shown), which is fixed to a predetermined portion (between right and left rear-seat foot-warming ducts 32f) of case 32a.

Cockpit module 10 is mounted in a vehicle in the following manner. At first, duct-base-plate 33 and duct cover 34 are air-tightly put together to form duct 35. Wire-integrated cluster 50 is put in gutter-shaped wire holder 33a, which is integrated to the upper surface of duct-base plate 33, and fixed to duct-base-plate 33 by wire-fixing member 34a and T-shaped hooks 34b.

At the same time, connectors 56 and 59, which branch from wire-integrated cluster 50, are fixed to connector holders 33c of duct-base-plate 33.

Distributor boxes 54 and 55 can be connected to the right and left ends of wire-integrated cluster 50 either before or after wire-integrated cluster 50 is fixed to duct-base-plate 33. The upper surfaces of distributor boxes 54 and 55 are fixed to the right and left ends of duct-base-plate 33 by screw bolts or the like. FIG. 3 illustrates both wire-integrated cluster 50 and distributor boxes 54 and 55, which are integrated into duct-base-plate 33.

Subsequently, air blower unit 31, air conditioning unit 32, and reinforcement bar 40 are fixed to duct-base-plate 33. Electronic control unit 39 is inserted between air blower unit 31 and air conditioning unit 32 and fixed thereto by screw bolts or the like.

If a housing (not shown) of a shaft of steering unit 41 is fixed to a steering-unit-support-portion of reinforcement bar 40 by a screw bolt or the like, the shaft can be supported by reinforcement bar 40. Steering wheel 41a, which may be an obstacle to assembling works, is preferably mounted after indication instrument 20 is mounted in a vehicle. The shaft of steering unit 41 can be fixed either before or after indication instrument 20 is mounted.

Next, air bag unit 20a for front passenger seat, meter module 20b, a center cluster and others are mounted in and integrated to the inside of indication instrument 20. Reinforcement bar 40 and indication instrument 20 are connected by a fixing member formed at side bracket 42. However, they can be connected in a different way.

Then, the above devices are connected to wire-integrated cluster 50 concurrently when the same devices are mounted in indication instrument 20 by connectors 56 and 59 fixed to duct-base-plate 33 and connector 58 fixed to case 32a. Thus, assembling of cockpit module 10 is completed.

Subsequently, cockpit module 10 is mounted into a vehicle. Firstly, side brackets 42, which are respectively fixed to the opposite ends of reinforcement bar 40, are fixed to the right and left sides of the vehicle body by screw bolts or the like. Indication instrument 20 is also fixed to portions of the vehicle body by screw bolts or the like.

Air conditioning unit 32 is fixed to the vehicle floor at fixture plates 32h by screw bolts or the like, and a front portion of air conditioning unit 32 is fixed to the vehicle-body-side of the partition (firewall) by screws bolts or the like. Thus, the upper surface of air conditioning unit 32 is fixed to duct-base-plate 33, and the bottom and front portions of air conditioning unit 32 are fixed to the vehicle body.

Air blower unit 31 is fixed to the partition, duct-base-plate 33, or a vehicle side portion.

Vehicle steering unit 41 can be separately fixed to a supporting portion of reinforcement bar 40 by the shaft's housing (not shown) thereof.

Figure 5:
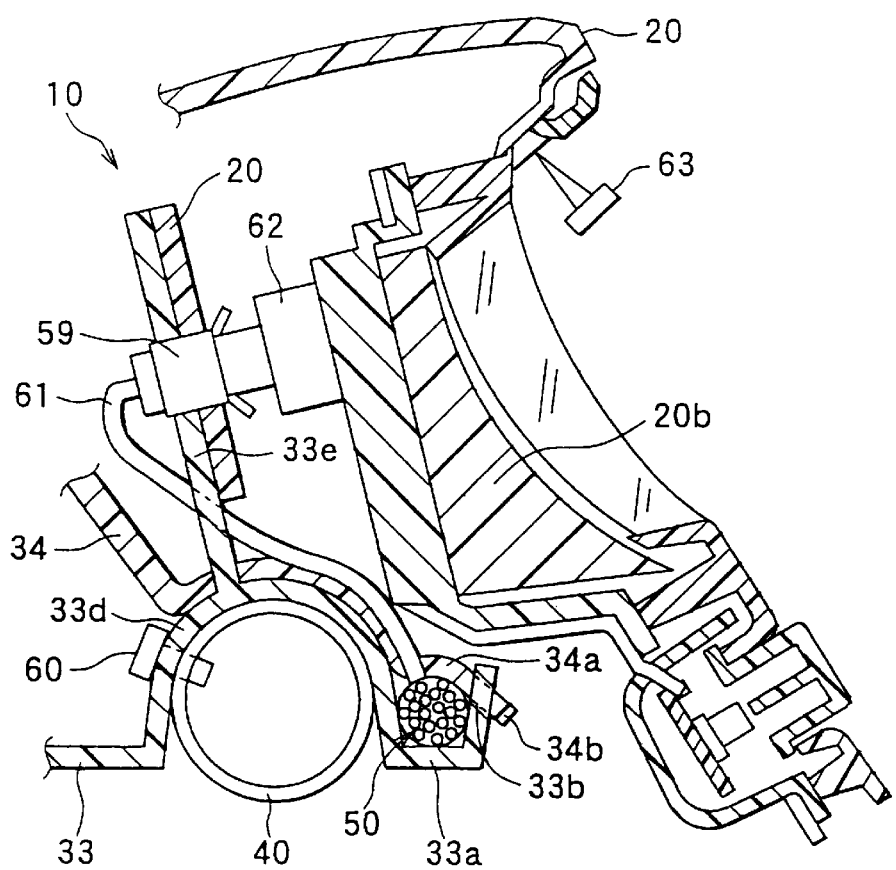
FIG. 5 is a cross-sectional view of a main portion of an indication instrument according to a second embodiment of the invention.

An indication instrument according to a second embodiment of the invention is described with reference to FIG. 5. Meter module 20b integrates therein a plurality of meters including a speedometer. Semi-cylindrical holder 33d is integrated with duct-base-plate 33 in front of gutter-shaped wire holder 33a. The upper outer periphery of pipe-shaped reinforcement bar 40 is fitted to semi-cylindrical holder 33d and fixed thereto by screw bolt 60. Thus, duct-base-plate 33 is fixed to reinforcement bar 40.

Support plate 33e extends upward from semi-cylindrical holder 33d of duct-base-plate 33. Support plate 33e penetrates wire fixing member 34a through a cutout of fixing member 34a. Wire 61 of the meter module branches from wire-integrated cluster 50. Wire 61 has connector 59 at its end, which is fixed at a portion of support plate 33e.

On the other hand, connector 62 is fixed to a portion of the back surface of meter module 20b. When meter module 20b is mounted in a prescribed portion of indication instrument 20, connector 62 of meter module 20b can be fitted to connector 59 that is fixed to duct-base-plate 33. Screw bolt 63 fastens meter module 20b to indication instrument 20.

Figure 6:
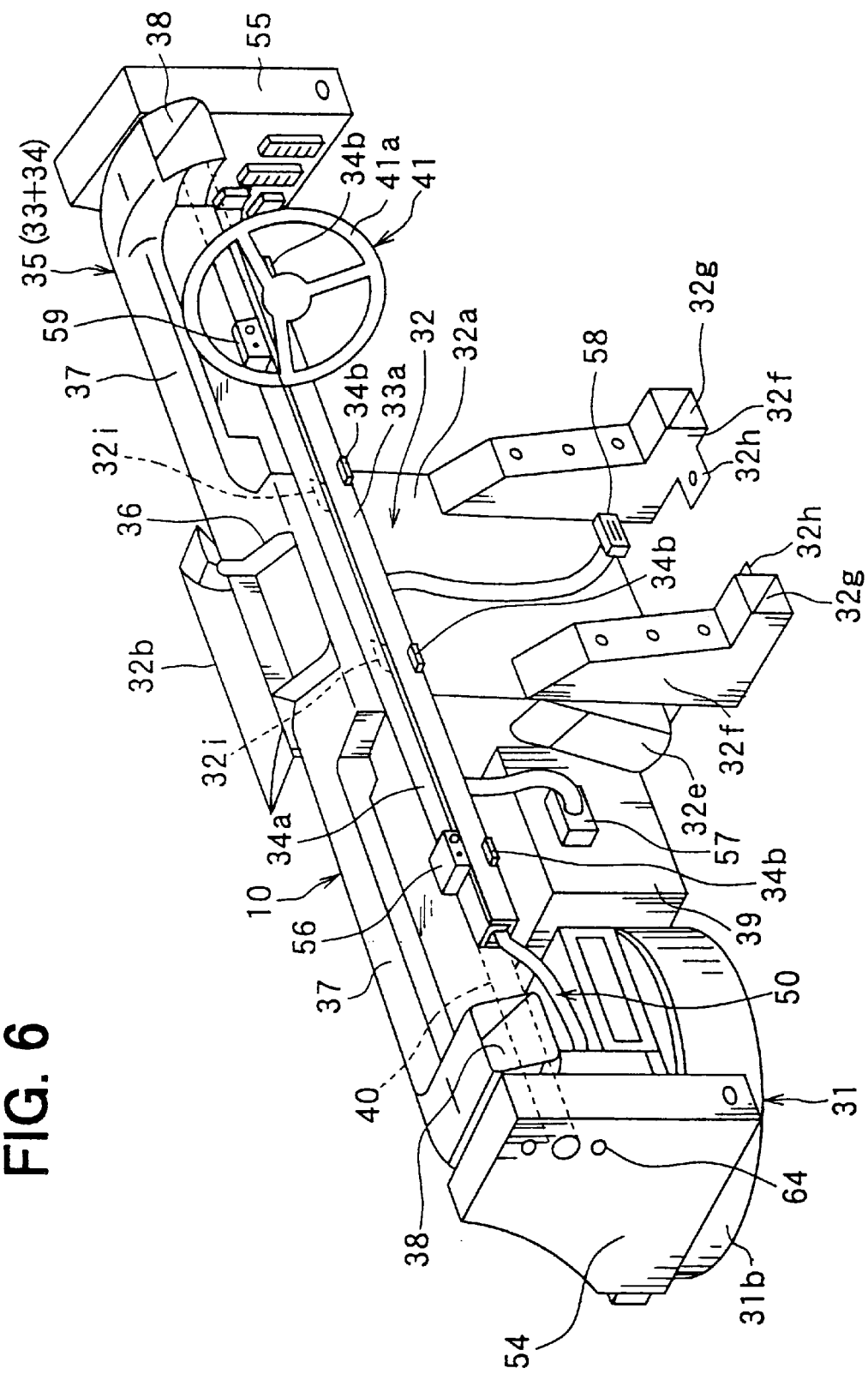
FIG. 6 is a perspective view of a cockpit module according to a third embodiment of the invention.

An indication instrument according to a third embodiment of the invention is described with reference to FIG. 6. Reinforcement bar 40 is provided with distributor boxes 54 and 55 as side brackets, which are fixed to the right and the left ends of reinforcement bar 40.

Therefore, distributor boxes 54 and 55 are reinforced to have strength sufficient for reinforcement members. For example, material, thickness and a reinforcing member to be added are selected or designed.

Distributor boxes 54 and 55 have a plurality of fixing holes 64 for screw bolts or the like (not shown) so that the opposite ends of reinforcement bar 40 can be respectively fixed to the opposite sides of the vehicle body. Thus, distributor boxes 54 and 55 function as side brackets 42. It is also possible that the opposite sides of duct-base-plate 33 are fixed to left and right distributor boxes 54 and 55.

Figure 7:
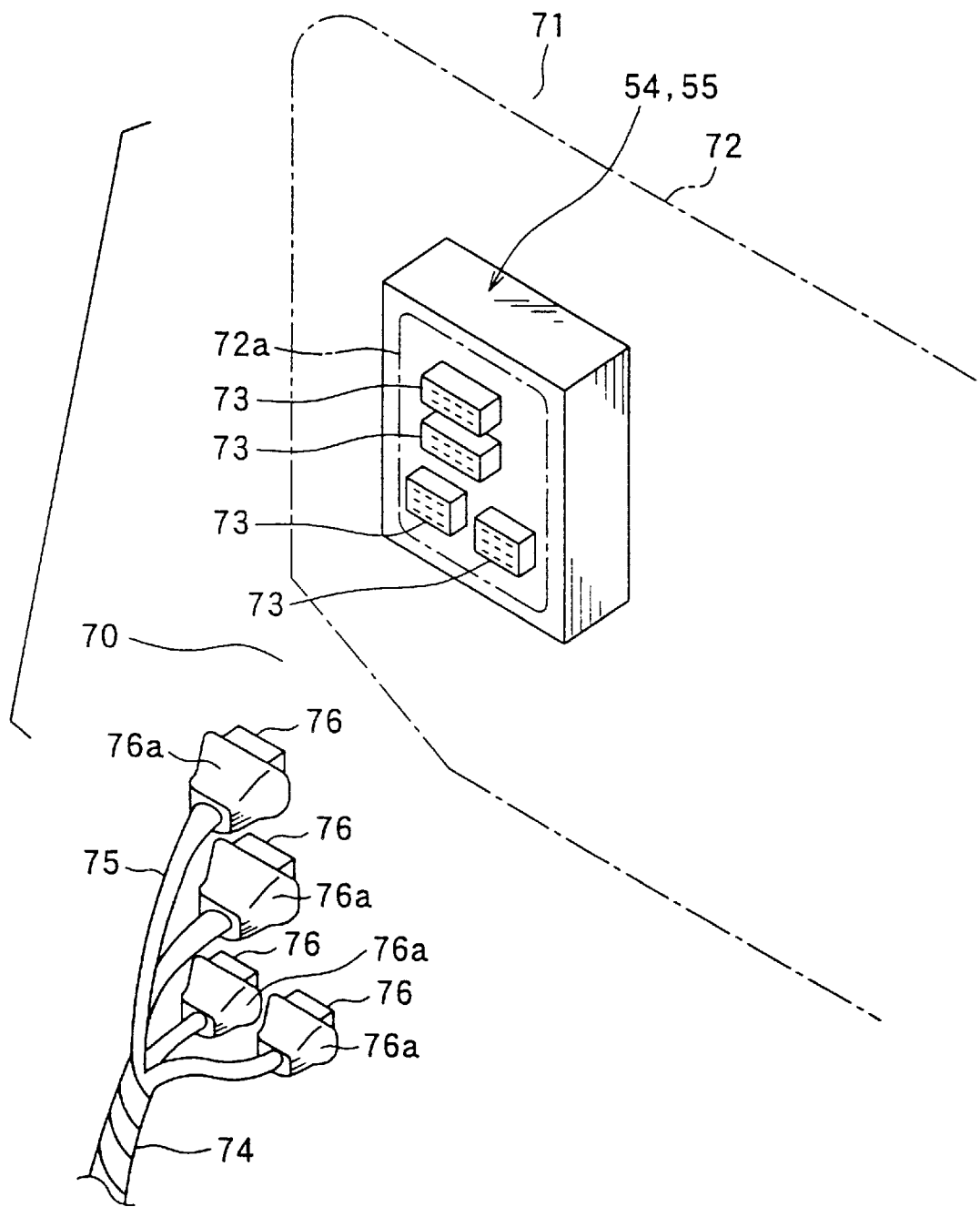
FIG. 7 is a schematic exploded view of connectors of a distributor box according to a fourth embodiment of the invention.
Figure 8:
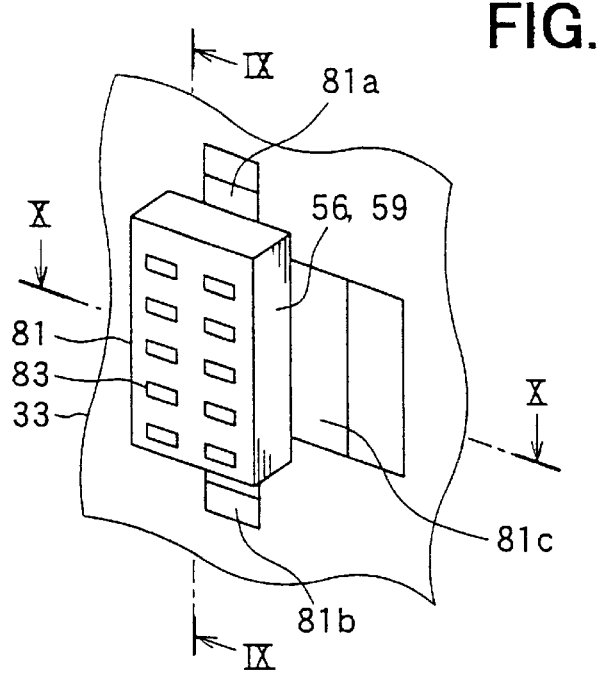
FIG. 8 is a schematic diagram of a receptacle connector according to a fifth embodiment of the invention.

An indication instrument according to a fourth embodiment of the invention is described with reference to FIG. 7.

Usually, indication instrument 20 is located adjacent the partition that divides engine compartment 70 and passenger compartment 71. Distributors 54 and 55, which are disposed in passenger compartment 71, are provided with penetrating connectors 73 at the front surface with regard to the vehicle.

Penetrating connector 73 penetrates through-hole 72a of partition 72 and projects into engine compartment 70.

Each penetrating connector 73 has a male connector terminal that projects into engine compartment 70. On the other hand, each wire 75 of wire cluster 74 disposed in engine compartment 70 has connector 76 having a female connector terminal that is fitted to the male connector terminal of one of penetrating connectors 73. Each connector 76 disposed in engine compartment 70 has rubber-made water-seal cover 76a covering the connector terminals.

Because penetrating connectors 73 of distributor boxes 54 and 55 project into engine compartment 70 through partition 73, connectors 76 can be fitted to penetrating connectors 73 easily in engine compartment 70.

An indication instrument according to a fifth embodiment of the invention is described with reference to FIGS. 8–11.

Receptacle connectors 56 and 59 have aligning structures for adjusting the position of the connector terminals. Each of receptacle connectors 56 and 59 is comprised of first connector member 81 and second connector member 82. Connector terminal 83 is fixedly sandwiched by first connector member 81 and second connector member 82. Connector terminal 83 is a female terminal.

Figure 9:
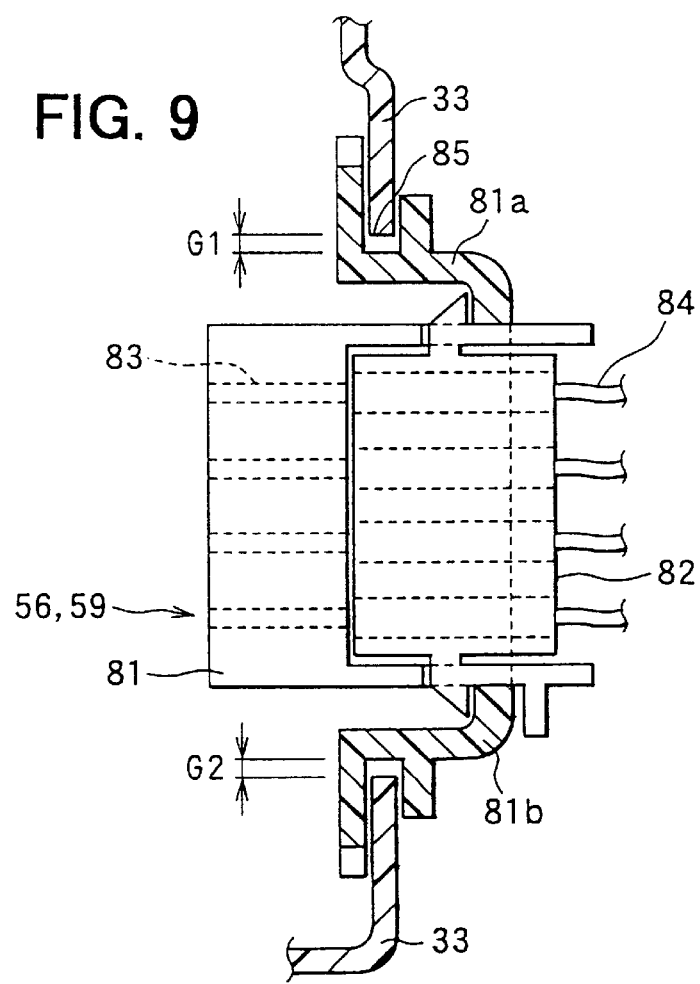
FIG. 9 is a cross-sectional view of the portion shown in FIG. 8 cut along line IX—IX.

Connector terminal 83 is connected to main wires 51 of wire-integrated cluster 50 through wires 84 disposed behind second connector member 82. First connector member 81 has integrally formed positioning pieces 81a, 81b and 81c, on the upper, lower and right sides thereof. Upper and lower positioning pieces 81a and 81b are loosely fitted to opening 85 of duct-base-plate 33 at gaps G1 and G2, as shown in FIG. 9, so that the position of first connector member 81 can be adjusted in the vertical directions.

Figure 10:
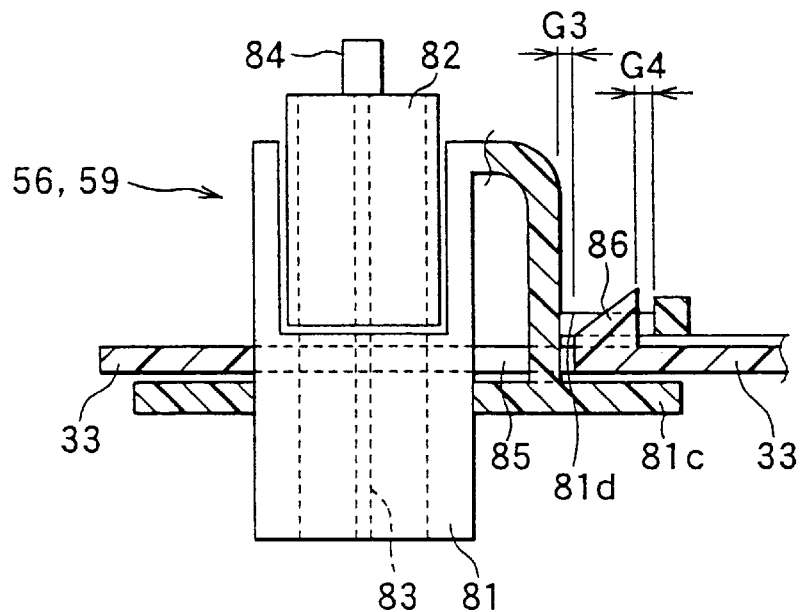
FIG. 10 is a cross-sectional view of the portion shown in FIG. 8 cut along line X—X.

Right positioning piece 81c has fixing hole 81d,as shown in FIG. 10. Fixing hook 86, which is formed at an edge of opening 85 of duct-base-plate 33 hole 81d,loosely engages fixing hole 81d at gaps G3 and G4 so that the position of first connector member 81 can be adjusted in the transverse directions. Therefore, first connector member 81 can be adjusted in all directions within respective gaps G1–G4.

Figure 11:
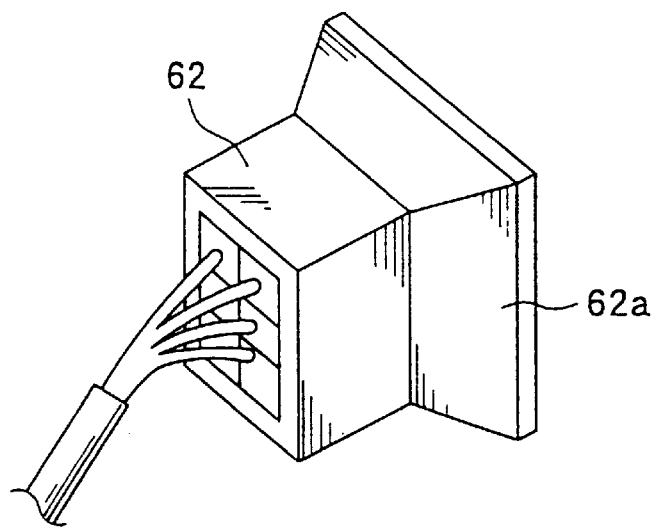
FIG. 11 is a schematic perspective view of a connector to be coupled to a receptacle connector according to a fifth embodiment of the invention.

FIG. 11 illustrates connector 62 fitted to receptacle connectors 56 or 59. It has a female connector terminal (not shown) to be fitted to male connector 83 of first connector member 81. Connector 62 has bell-bottom-shape guide flange 62a.

Therefore, when connector 62 is pressed on one of receptacle connectors 56 and 59, the front edge (the left edge shown in FIG. 9) of first connector member 81 is guided and moved along the inner surface of guide flange 62a to the center of guide flange 62a.

As a result, even if there is a slight discrepancy between connectors 56, 59 and connector 62 of devices 20a, 20b, the aligning structure of connectors 56 and 59 can absorb it and establish complete electrical connection.

A gutter-shape wire-holder extending transversely in a vehicle at a prescribed (upper) position of air blow unit 31 and air conditioning unit 32 can be used for holding wire-integrated cluster 50 thereof.

It is possible to mount an exclusively provided transverse member for holding wire-integrated cluster 50 inside indication instrument 20.

Air blow unit 31 and air conditioning unit 32 can be separated from module 10. In this case, air blow unit 31 and air conditioning unit 32 are mounted in a vehicle after cockpit module 10 is mounted in the vehicle.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A wiring system for an indication instrument for a vehicle disposed near a steering unit, said wiring system comprising:
    a transverse member Hosed at a cowling portion of the vehicle extending in a transverse direction of said vehicle;
    a wire-integrated cluster connected to said indication instrument and disposed inside said transverse member to extend straight along said transverse member for transmitting electric power and signals;
    a pair of electric distributor boxes disposed at opposite ends of said transverse member for distributing said electric power and signals transmitted by said wire-integrated cluster;
    a reinforcement member extending in the transverse direction of said vehicle along said transverse member for supporting said steering unit; and
    means for directly fixing said distributor boxes and said reinforcement member to a portion of said vehicle.

2. The wiring system, for an indication instrument for a vehicle as claimed in claim 1, wherein
    said transverse member comprises a duct of an air conditioner for conducting air.

3. The wiring system as claimed in claim 1 wherein said fixing means comprises a pair of side brackets disposed at opposite ends of said vehicle.

4. The wiring system as claimed in claim 1 further comprising an electric device having a first connector and wherein a second connector branches from said wire-integrated cluster, wherein said first and second connectors are fitted and electrically connected to each other.

5. The wiring system as claimed in claim 1 wherein said pair of electric distributor boxes and said fixing means are integrated into a unit.

6. A wiring system for an indication instrument for a vehicle disposed near a steering unit, said wiring system comprising:
    a transverse member disposed at a cowling portion of the vehicle extending in a transverse direction of said vehicle;
    a wire-integrated cluster connected to said indication instrument and disposed inside said transverse member to extend straight along said transverse member for transmitting electric power and signals;
    a pair of electric distributor boxes disposed at opposite ends of said transverse member for distributing said electric power and signals transmitted by said wire-integrated cluster;
    a reinforcement member extending in the transverse direction of said vehicle along said transverse member for directly supporting said steering unit;
    means for directly fixing said distributor boxes and said reinforcement member to a portion of said vehicle;
    a receptacle connection branching from said wire-integrated cluster and being fixed to said transverse member at a prescribed position; and
    an electric device having a connector connected to said receptacle connector.

* * * * *

UNITED STATES PATENT AND TRADEMARK OFFICE
CERTIFICATE OF CORRECTION

PATENT NO.    : 6,474,716 B2
DATED         : November 5, 2002
INVENTOR(S)   : Kazushi Shikata et al.

It is certified that error appears in the above-identified patent and that said Letters Patent is hereby corrected as shown below:

<u>Title page,</u>
Item [73], add -- Assignee: Denso Corporation, Kariya (JP) --

Signed and Sealed this

Eighth Day of April, 2003

JAMES E. ROGAN
*Director of the United States Patent and Trademark Office*